No. 804,763. PATENTED NOV. 14, 1905.
C. PAHDE.
PROCESS OF ELECTRICALLY WELDING RAILS.
APPLICATION FILED JULY 11, 1905.
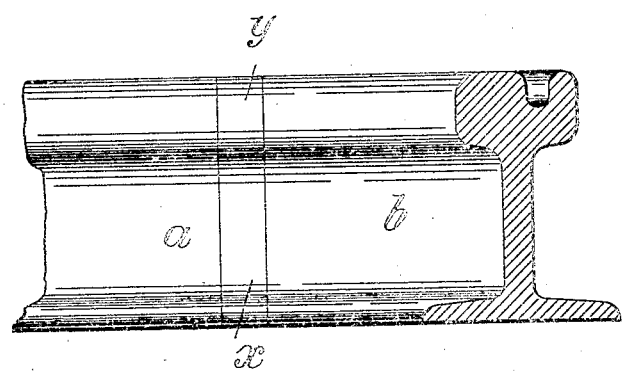
WITNESSES.
Paul A. Blair.
E. W. Collins
INVENTOR
CARL PAHDE
By Howson and Howson
ATTORNEYS.

UNITED STATES PATENT OFFICE.

CARL PAHDE, OF BRESLAU, GERMANY.

PROCESS OF ELECTRICALLY WELDING RAILS.

No. 804,763.  Specification of Letters Patent.  Patented Nov. 14, 1905.

Application filed July 11, 1905. Serial No. 269,223.

*To all whom it may concern:*

Be it known that I, CARL PAHDE, a subject of the King of Prussia, German Emperor, residing at 63–65 Hohenzollernstrasse, in Breslau, Empire of Germany, have invented certain new and useful Improvements in Processes of Electrically Welding Rails; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

This invention relates to certain new and useful improvements in the process of electrically welding rails by means of the voltaic arc. Various means have heretofore been employed to attain this object.

In my improved process different kinds of iron may be used in any known manner and melted by means of the voltaic arc and poured into the frontal joint of two rails, or different degrees of hardness are to be given to the soldering material by the addition of mangan, wolfram, nickel, and the like.

Heretofore in these processes the whole soldering material had a uniform hardness throughout, which is a great disadvantage for the reason that if the soldering material is soft throughout it will wear off through the action of the wheels sooner than the rails proper, and if the soldering is hard throughout it is apt to crack very easily while in use. Therefore the welding of rails in this manner is naturally not of much value.

My invention has for its object to do away with those disadvantages by electrically welding the frontal joint of two rails by means of the voltaic arc in such a manner that the base of the soldering material will be soft, while the top will be sufficiently hard.

To enable others skilled in the art to make and use my invention, I will proceed to describe the arrangement of the same, referring by letters to the accompanying drawing, which represents a side view of two rails which are electrically welded according to my invention.

The soldering material is designated by $xy$. The two rails are marked $a$ and $b$ and are made usually of steel. The soldering material at the base of the rails (shown by $x$) consists up to a certain height of soft material and only between the heads of said rails (shown by $y$) of hard material.

According to my invention the frontal joint of two rails is welded in the following manner: At first the frontal joint, formed between the ends of contiguous rails, is filled with soft iron, destitute of carbon, nearly up to the upper part of the heads of the rails, and the rails are then melted together at their ends. Afterward in order to weld the upper part, which may have a height of only one-half to one inch, iron rich in carbon, mangan, nickel, or any other materials for hardening, or a combination of different materials, is put between the heads of the rails, so that after cooling the upper part of the frontal joint consists of a material which wears off very slowly.

Having fully described my invention, what I claim as new, and desire to secure by Letters Patent, is—

1. The herein-described process of electrically welding the ends of two contiguous rails by means of an electric arc, which consists in passing an electric current therethrough after the joint between said ends has been filled in the lower portion thereof with soft metal and at the heads of the said rails with hard material and thereby melting the rail ends together, substantially as described.

2. The herein-described process of electrically welding the ends of two contiguous rails by means of an electric arc, which consists in passing an electric current therethrough after the joint between said ends has been filled at the lower portion thereof with soft iron and at the heads of the rails with iron containing carbon or other hardening material as described and thereby melting the rail ends together, substantially as described.

3. The herein-described process of electrically welding the ends of two contiguous rails by means of an electric arc, which consists in filling the lower portion of the joints with a soft metal at a point near the surface of the rails, then passing an electric current through the rail ends and the filling material to melt the ends together, then filling the upper portion of the joints with hard metal and passing an electric current through the rail ends and said filling material to melt the rails together at their heads, substantially as described.

4. The herein-described process of electrically welding the ends of two contiguous rails by means of an electric arc, which consists in filling the frontal joint of the rails with soft iron from the base to a point near the heads of the rails, passing an electric current through the rail ends and said filling material to melt the ends together, then filling the upper portion of the frontal joint with hard iron, and then passing an electric current through the rail ends and said filling material to melt the upper parts of said ends together, substantially as described.

In testimony whereof I have signed my name to this specification in the presence of two subscribing witnesses.

CARL PAHDE.

Witnesses:
JOHANNES HEIN,
HENRY HASPER.